No. 619,981. Patented Feb. 21, 1899.
T. F. MOSS.
SYRINGE.
(Application filed Sept. 18, 1897.)
(No Model.)
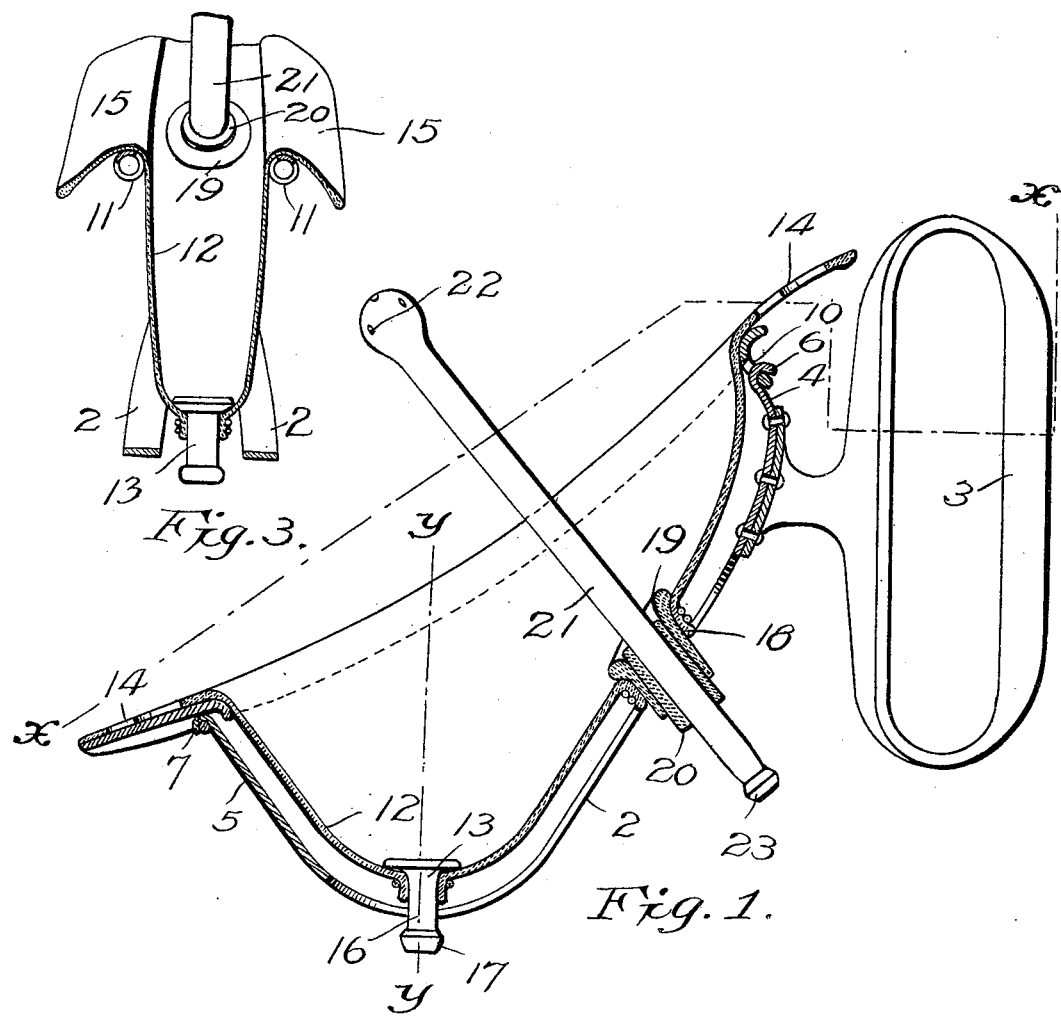
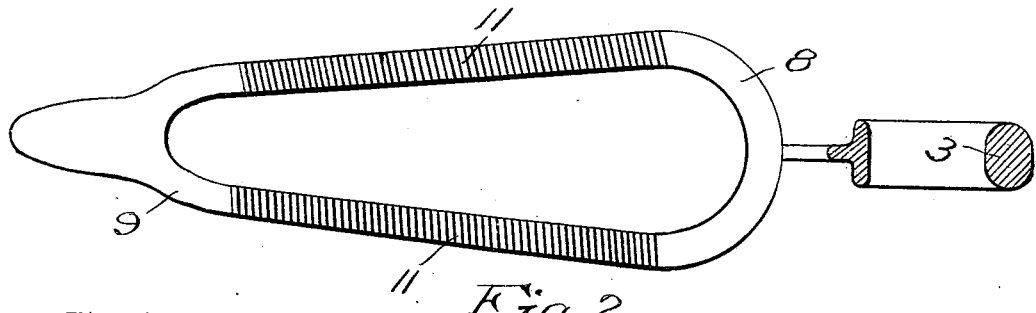
Witnesses:
O. E. Van Dorn
Richard Paul.
Inventor:
Thomas F. Moss.
By Paul & Hawley
his attorneys.

UNITED STATES PATENT OFFICE.

THOMAS FRANCIS MOSS, OF LA CROSSE, WISCONSIN.

SYRINGE.

SPECIFICATION forming part of Letters Patent No. 619,981, dated February 21, 1899.

Application filed September 18, 1897. Serial No. 652,143. (No model.)

*To all whom it may concern:*

Be it known that I, THOMAS FRANCIS MOSS, of La Crosse, La Crosse county, Wisconsin, have invented certain new and useful Improvements in Syringes, of which the following is a specification.

My invention consists generally in a frame, a flexible catch-basin provided with inlet and outlet openings, and a nozzle arranged in said inlet-opening.

Further, the invention consists in a main frame and auxiliary frame carried thereby, a catch-basin supported by said auxiliary frame and provided with suitable inlet and outlet nozzles.

Further, the invention consists in a main frame, an auxiliary frame, a catch-basin removably arranged within said auxiliary frame and provided with inlet and outlet openings, and an adjustable nozzle arranged in said inlet-opening.

Further, the invention consists in various constructions and combinations, all as hereinafter described, and particularly pointed out in the claims.

In the accompanying drawings, forming part of this specification, Figure 1 is a sectional view of a syringe embodying my invention. Fig. 2 is a view on the line $xx$ of Fig. 1. Fig. 3 is a sectional view on the line $yy$ of Fig. 1.

In the drawings, 2 is the main frame of the device, preferably of flexible material and provided, preferably at its upper end, with a handle 3 and at each end with forwardly-projecting arms 4 and 5, having looped ends 6 and 7 for the purpose hereinafter described. I prefer to provide an auxiliary frame substantially oval in form fitting within the main frame 2 and having curved end parts 8 and 9, provided with slots 10 to receive the looped ends 6 and 7 on the main frame, whereby the main and auxiliary frames are secured together. The middle portions 11 of the auxiliary frame connecting the end parts 8 and 9 are composed, preferably, of closely-coiled wires, which permit longitudinal as well as lateral expansion of the auxiliary frame, thus permitting the frame to conform to the surfaces upon which it is placed and also permitting it to be easily separated from the main frame for cleansing purposes. Within the receptacle thus formed by the main and auxiliary frames I suspend a preferably flexible catch-basin 12, made, preferably, of rubber, its mouth being substantially oval in form, corresponding to the auxiliary frame, and at its lower end being enlarged to permit the liquid to accumulate therein before passing off through the outlet-opening 13, provided in the bottom of the basin, wherein is preferably arranged a short nozzle 16, having an enlarged outer end 17, to which may be connected a rubber tube or other discharge-pipe. I also provide an inlet-opening 18 in the bottom of the basin, preferably near its upper end, arranging a bushing 19 therein, said bushing being adapted to receive a plug or stopper 20, having a central tapering opening, through which an inlet-nozzle 21 may be inserted and adjustably supported, said nozzle having openings 22 in its inner end and an enlarged outer end 23, to which the end of the supply-pipe may be secured. To aid in supporting the catch-basin in position in the auxiliary frame, I prefer to provide end ears or extensions 14, having slots to permit the sides of the basin to be securely connected to the main frame, if desired, and I also prefer to provide similar ears or extensions 15 on the sides of the basin, resting upon the sides of the auxiliary frame, and in connection with the extensions 14 preventing the liquid from escaping over the sides of the basin while the device is in use.

While I have not shown buttons or lugs upon the main frame to which the ears or extensions upon the catch-basin may be connected, it is obvious that such parts may be provided to aid in supporting the catch-basin within the auxiliary frame.

As shown in Fig. 3, the main frame 2 has a large central opening to permit the outer ends of the inlet and outlet nozzles to project through the rear wall of the device and to permit the supply and waste tubes to be readily connected to said nozzles. Both the main and auxiliary frames are preferably narrower at their lower than at their upper ends to permit the device to be readily adjusted and operated without causing inconvenience or discomfort to the person using the same.

The operation of my improved syringe is as follows: The inlet and outlet nozzles being connected to the supply and waste pipes or tubes, the device is placed in position and the end of the tube 21 inserted the desired distance into the vagina, the flow of water in the meantime being prevented by a valve in the supply-pipe or by other suitable means. The device may be held in position by grasping the handle 3, and the flexible main and auxiliary frames permit the edges of the catch-basin and the ears thereon to adjust themselves and fit closely around the opening leading to the part to be sprayed.

When the device is properly adjusted, the water is permitted to flow through the tube 21 and the openings 22 in the inner end thereof until the operation of spraying is completed, and as the water and mucus flow back they will be caught by the catch-basin and pass out through the waste-nozzle 16 into a waste-pipe connected thereto and be discharged into a receiving vessel provided for the purpose.

By providing the bushing 19 and the stopper 20 therein the position of the inlet-nozzle may be changed at will while the device is in use without the necessity of removing the same from its position. When the operation is completed, the catch-basin may be detached from the auxiliary frame and the nozzle and other parts which came in contact with the body of the person using the device thoroughly cleansed of all impurities.

Obviously the details herein described may be varied by any one skilled in the art, and I therefore do not confine myself to the construction shown.

Having thus described my invention, I claim as new and desire to secure by Letters Patent—

1. In a device of the class described, the combination, with a main frame, of an auxiliary frame carried thereby, a catch-basin removably arranged within said auxiliary frame and provided with suitable inlet and outlet openings, and nozzles for said openings, substantially as described.

2. In a syringe, the combination, with a main frame, of a removable auxiliary frame, a catch-basin carried thereby having inlet and outlet openings, nozzles for said openings, the side sections of said auxiliary frame being both laterally and longitudinally expansible, substantially as described.

3. A syringe, comprising a main frame and handle, a flexible auxiliary frame, said main frame being provided with projecting arms having looped ends to engage said auxiliary frame, a catch-basin carried by said auxiliary frame, and having inlet and outlet openings, a nozzle fitting within said inlet-opening and the side and end ears provided on said catch-basin, for the purpose set forth.

4. A syringe comprising a basin having flexible edges, in combination with the nozzle and the outlet-conduit of said basin, and a flexible supporting or suspending frame for the edges of said basin, substantially as described.

5. A syringe comprising a basin having flexible edges, in combination with the nozzle and the outlet-conduit of said basin, and a flexible supporting or suspending frame for the edges of said basin, and between the ends of which said basin is stretched or held, substantially as described.

6. As a new article of manufacture, a syringe comprising a catch-basin, a main frame or other support wherein said basin is removably arranged, said basin being provided with inlet and outlet openings, and a nozzle adjustably arranged within said inlet-opening, substantially as described.

In testimony whereof I have hereunto set my hand this 20th day of August, A. D. 1897.

THOMAS FRANCIS MOSS.

In presence of—
FRANK WINTER,
JOHN J. ESCH.